United States Patent [19]

Crane et al.

[11] 4,086,567
[45] Apr. 25, 1978

[54] HANDWRITING VERIFICATION SYSTEM USING LANDMARKS

[75] Inventors: Hewitt David Crane, Portola Valley; Daniel Errol Wolf, Menlo Park, both of Calif.

[73] Assignee: Stanford Research Institute, Menlo Park, Calif.

[21] Appl. No.: 716,344

[22] Filed: Aug. 20, 1976

[51] Int. Cl.² .............................................. G06K 9/00
[52] U.S. Cl. .................. 340/146.3 SY; 340/146.3 SG
[58] Field of Search .................... 340/146.3, 146.3 SY, 340/146.3 SG, 146.3 H, 146.3 Q

[56] References Cited

U.S. PATENT DOCUMENTS

| 3,699,517 | 10/1972 | Dyche | 340/146.3 SY |
| 3,930,229 | 12/1975 | Crane et al. | 340/146.3 SY |
| 3,962,679 | 6/1976 | Engelbrecht | 340/146.3 SY |
| 3,983,535 | 9/1976 | Herbst et al. | 340/146.3 SY |

Primary Examiner—Joseph M. Thesz
Attorney, Agent, or Firm—Lindenberg, Freilich, Hornbaker, Wasserman, Rosen & Fernandez

[57] ABSTRACT

When signals derived from a template signature are to be compared directly with signals derived from a specimen signature, because no two signatures are alike, there is a requirement for providing a certain degree of "rubberiness" between the specimen and template signals. Previously such rubberiness was achieved by breaking the signal up into fixed portions and then conducting translation, stretch and contraction between these fixed portions in the course of the comparison. In this invention, advantage is taken of the existence of prominent landmarks in the template and specimen signatures, and the signatures are broken up between these landmarks for the purpose of achieving rubberiness and/or translation. The landmarks in the signals derived from the signatures to be compared are exactly aligned before the correlation process is undertaken.

10 Claims, 5 Drawing Figures

Fig. 2A

HANDWRITING VERIFICATION SYSTEM USING LANDMARKS

BACKGROUND OF THE INVENTION

This invention relates to systems used for signature verification and more particularly to improvements therein. In an application, Ser. No. 681,118, now U.S. Pat. No. 4,040,012, entitled Handwriting Verification System, by Crane et al., and assigned to a common assignee, there is described a system for comparing signature-derived signals. Included in the correlation process is a method and means for achieving a certain degree of rubberiness between signals derived from specimen and template signatures. The rubberiness is achieved by breaking the signals into fixed portions, or segments, such as halves or thirds, and then performing a stretching and contracting operation between corresponding halves or thirds. The signals are not examined for any particular features; the process of segmentation is blind, in other words it is performed independent of the nature of the signals. Where there are no explicit landmarks in the signal, this process is very useful. However, if the signature generated signals have prominent landmarks, and if advantage can be taken of the presence of those landmarks, the operation of stretching or contracting the portion of specimen signals between each pair of landmarks for subsequent correlation can be made much simpler and more economical.

OBJECTS AND SUMMARY OF THE INVENTION

An object of this invention is to provide a novel method and means for processing specimen signals for comparison with template signals.

Another object of this invention is the provision of a method and means for enabling a signature derived specimen signal to be divided into segments between prominent landmarks and stretching or contracting the segments as required.

The foregoing and other objects of the invention are achieved by generating force signals, such as a pressure force, P, representative of the force exerted by a pen perpendicular to the plane of the paper as the signature is being written, a left-right force, X, in the plane of the paper, and a near-far force, Y, in the plane of the paper. These signals are sampled at a suitable sampling frequency and the samples are converted to digital signals. Prominent landmarks in the signals, such as the occurrence of "pen-ups", which take place when the pen is lifted from the paper during the course of the signature, are utilized for segmenting the train of digital signals which are derived from the specimen signature. Each sequence of digital samples occurring between pen-up signals is directed to a different register. The number of pen-ups occurring during the writing of the specimen signature are counted and compared with the number of pen-ups which occur during the writing of the template signature. If they are the same, then each segment of the specimen signature which is stored in a separate register is "normalized" or stretched or shortened as required to correspond to the length of the section between pen-up signals in the template signature. Thereafter, the template digital signal samples between segments may be compared with the stretched or reduced specimen signature digital samples by any desired correlation technique.

The novel features of the invention are set forth with particularity in the appended claims. The invention will best be understood from the following description when read in conjunction with the accompanying drawings.

DESCRIPTION OF THE PREFERRED EMBODIMENTS

Figures 1, 3, 4:
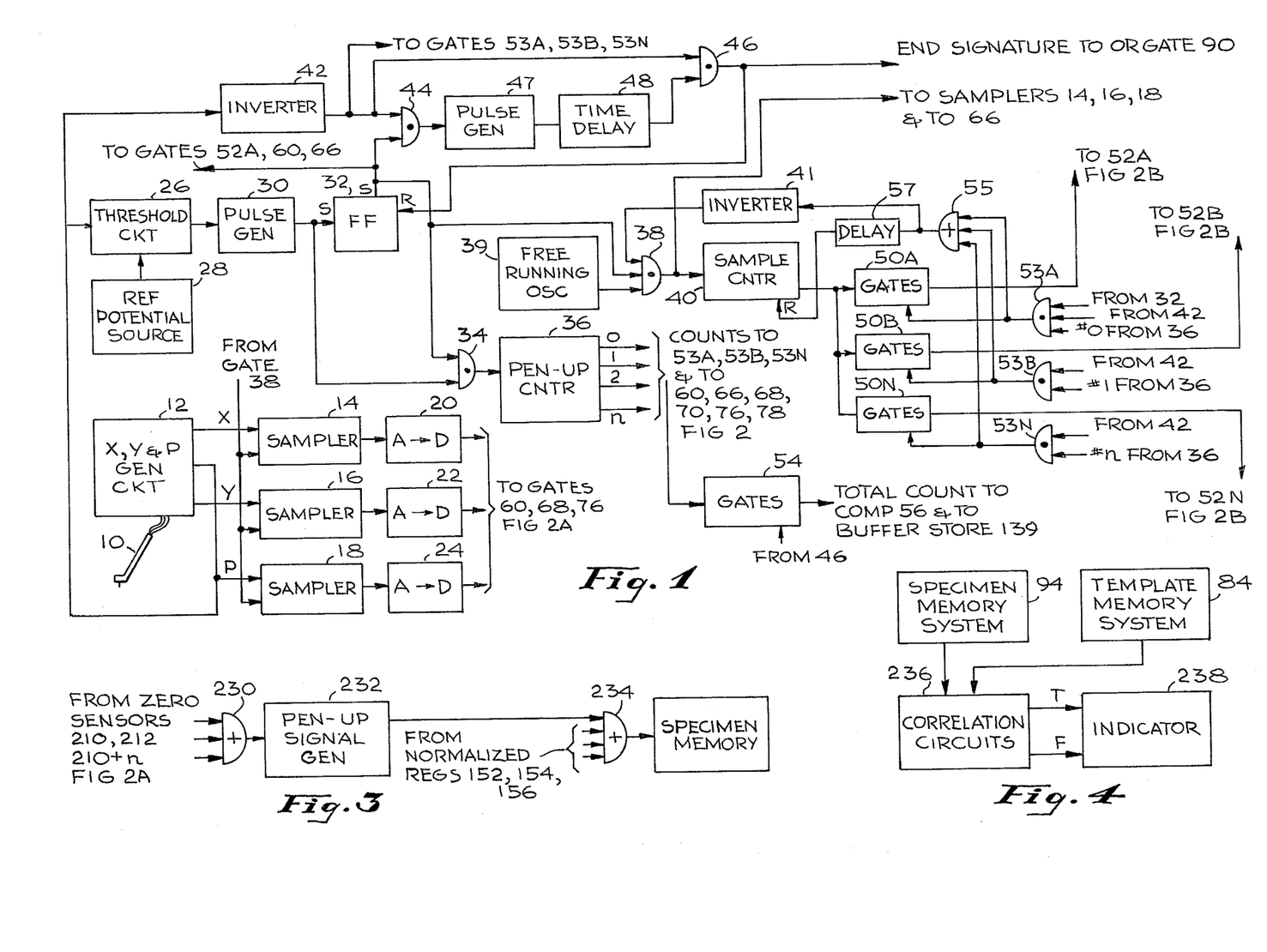
FIG. 1 is a block schematic diagram of a system for generating X, Y and P signals from the signature being written, as well as determining landmark signals.
FIG. 3 is a block schematic diagram indicating how the digital signal train derived from the specimen signature can have landmark signals inserted therein to assist in subsequent processing.
FIG. 4 is a block schematic diagram illustrating how the process specimen signals can then be processed through correlation circuits for comparison with the template signals.

FIG. 1 is a block schematic diagram illustrative of how the P, X and Y force signals may be generated in writing with a pen and how pen-up signals are detected and counted. A pen of the type suitable for use with this invention together with the necessary associated circuitry which will generate the X, Y and P signals is described and claimed in U.S. Pat. No. 3,915,015. The circuitry shown in FIG. 1 may be used for recording a template signature as well as for recording a sample signature which is to be compared with the template signature for verification. A pen 10, and signal generating circuit 12, which are associated therewith, produce X, Y and P signals, which are respectively representative of the direction forces and pressure. These are analog signals which are respectively applied to three sampler circuits, respectively 14, 16 and 18. These sampler circuits, are periodically enabled to sample the signals applied to their inputs in response to pulses received from a free-running oscillator, as will be subsequently described. The sample signals, which constitute the outputs of the respective sampler circuits 14, 16 and 18 are respectively applied to analog to digital converting circuits 20, 22 and 24 (A/D), to provide digitized samples. The outputs of the three A/D circuits are transferred to a plurality of registers, in a manner which will be subsequently described herein.

The pressure signal provided by the generating circuit 12, is also applied to a threshold circuit 26. The threshold circuit measures the amplitude of the P signal against a preestablished reference potential, provided from a reference potential source 28. If the pressure signal exceeds the reference potential signal, the threshold circuit 26 applies an output to a threshold pulse generator 30, which produces a single pulse in response thereto. The pulse generator output sets a flip flop 32 and is also applied to a gate 34, which receives enabling input from the set output of the flip flop 32. The output of the gate 34 is applied to a pen-up counter 36.

As will be subsequently described, flip flop 32 remains set until the end of the signature. Each time the pen 10 is lifted from the paper and, within a predetermined interval, the pen is again applied to the paper, pulse generator 30 will provide an additional pulse. Thus, by counting the number of pulse outputs from pulse generator 30 during a signature, one can determine how many times the pen was lifted during the signature. Accordingly, the pen-up counter 36 at the end of the signature will contain a total count equal to the number of pen-ups that occur during the signature.

The set output of flip flop 32, together with the output of an inverter 41, enables a gate 38. The output of a free-running oscillator 39, can then be applied by the gate 38 to a sample counter 40, and also to the sampling circuits 14, 16 and 18, whereby they can sample the respective X, Y and P input signals.

The P output of the X, Y and P generating circuits 12 is also applied to an inverter 42, the output from which is applied to two And gates, respectively 44 and 46. Gate 44 is enabled when flip flop 32 is transferred to its set condition. Accordingly, when this occurs the output of the inverter 42, in response to a P signal is applied to a pulse generator 47. The pulse generator 47 generates a pulse which is applied to a time delay circuit 48. Should an enabling output from the inverter 42 still be present at the end of the delay, provided by time delay circuit 48, And gate 46 provides an output which can be considered as an "end of signature" output. This is used to reset the flip flop 32. The time delay 48 establishes an interval between its input and output sufficiently long so that pen-ups required for going from one word or one character to another or for crossing t's or dotting i's will transpire before that interval. Only when the pen has been lifted for a sufficient time to indicate that the signature has been terminated is an output received from the time delay circuit 48.

It should be noted that the inverter 42 will provide an output each time the pen is lifted from the paper whereby gates 44 and 46 will have a signal applied thereto. In the presence of an output from And gate 46, flip flop 32 is reset whereby And gates 34 and 38 are no longer enabled.

The output of the sample counter 40 is applied to as many sets of gates as there are signature segments which will be handled by the system. Three sets of gates respectively 50A, 50B, 50N are shown by way of example. The gates are successively enabled to transfer the counts of the sample counter 40, applied to their inputs, respectively to buffer storage circuits respectively 52A, 52B, 52N (FIG. 2B) in response to outputs from respective And gates 53A, 53B, 53N. These And gates are successively enabled to provide outputs in response to successive counts 0, 1, 2, n from pen-up counter 36 and the output from inverter 42, which occurs whenever pen 10 is lifted. And gate 53A also requires a set output from flip flop 32. An Or gate 55 receives an output from each one of the And gates 53A, 53B, 53N and applies this output to the inverter 41 and to a delay circuit 57. The output of the delay circuit resets the sample counter. Inverter 41, in the presence of the input from the Or gate 55, inhibits And gate 38 from passing further outputs from the oscillator 39.

From the foregoing it should be understood that the sample counter counts the number of samples taken of a specimen signature between pen-ups. When the pen is first lifted from the paper, after writing has commenced, inverter 42 will provide an output signal and the pen-up counter will still be in its zero state. Gates 50A are enabled to transfer the count of sample counter 40 to buffer store 52A, and after a delay by delay circuit 57, long enough to permit this count transfer to take place, the sample counter is reset. When the writer applies pen 10 to the paper again, the inverter output drops, And gate 38 is enabled to pass pulses from oscillator 39, and the sample counter starts counting the number of samples taken of the signature until the next pen-up occurs. At this time, the pen-up counter will contain a 1 count. And gate 53B is enabled and the count in the sample counter is transferred to buffer store 52B. The sample counter is then reset and will start counting the number of samples in the next signature segment as soon as the pen 10 is applied for writing again. The foregoing sequence of transfer of the number of samples taken for each signature segment to a separate buffer store occurs until the signature is finished.

The total count of the pen-up counter 36 is applied to a set of gates 54 which are enabled to transfer this count to a comparator 56 (FIG. 2A) and to a buffer store 139 (FIG. 2B). The individual counts of the pen-up counter besides being applied to And gates 53A, 53B, 53N as described, are applied to And gates 60, 66, 68, 70 and 76, 78 as will be subsequently described.

Figure 2A:
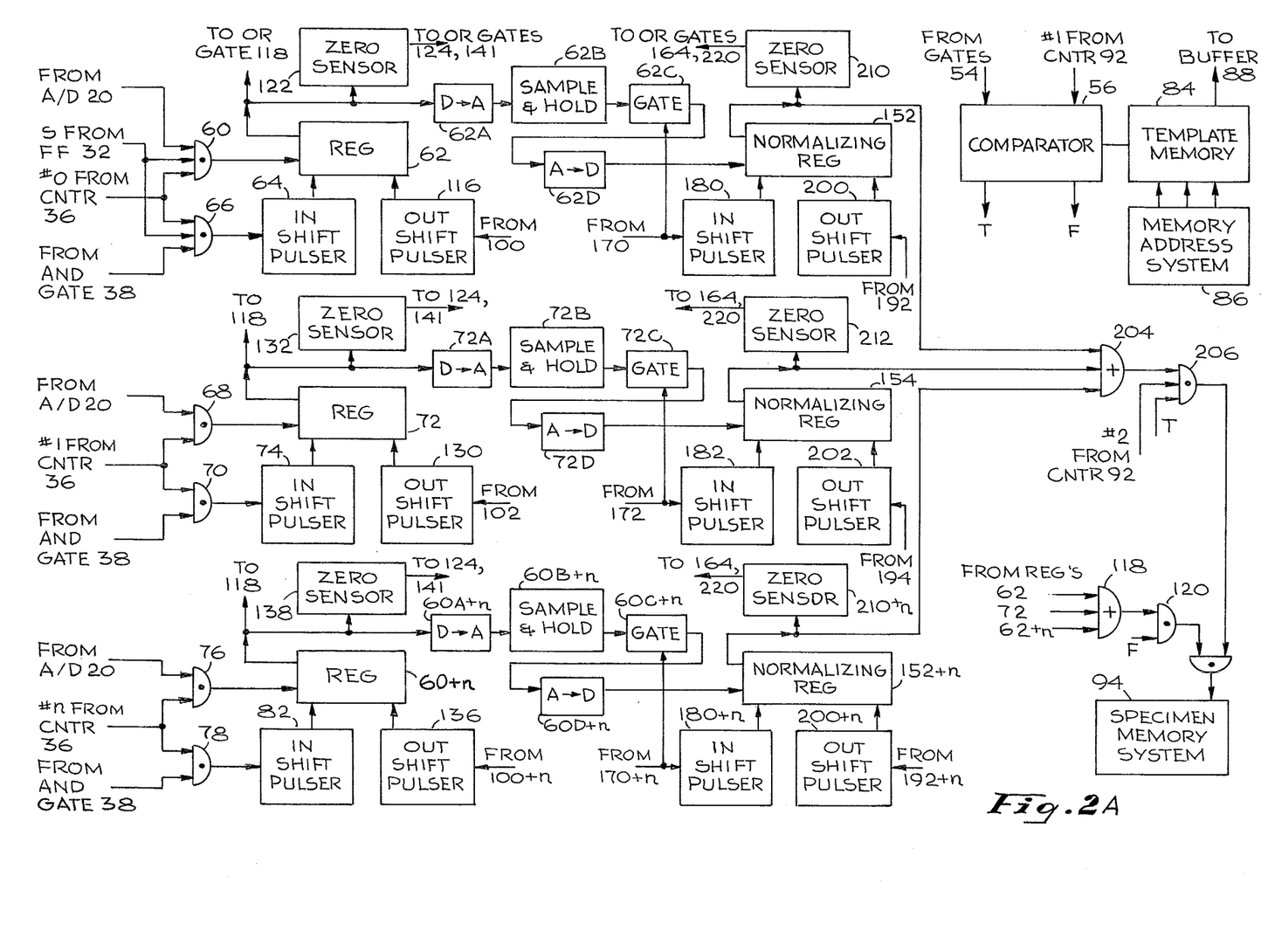
FIGS. 2A & 2B are block schematic diagrams of arrangements for expanding or contracting the digital signal trains between landmark signals in the specimen derived from the specimen signature.
Figure 2B:
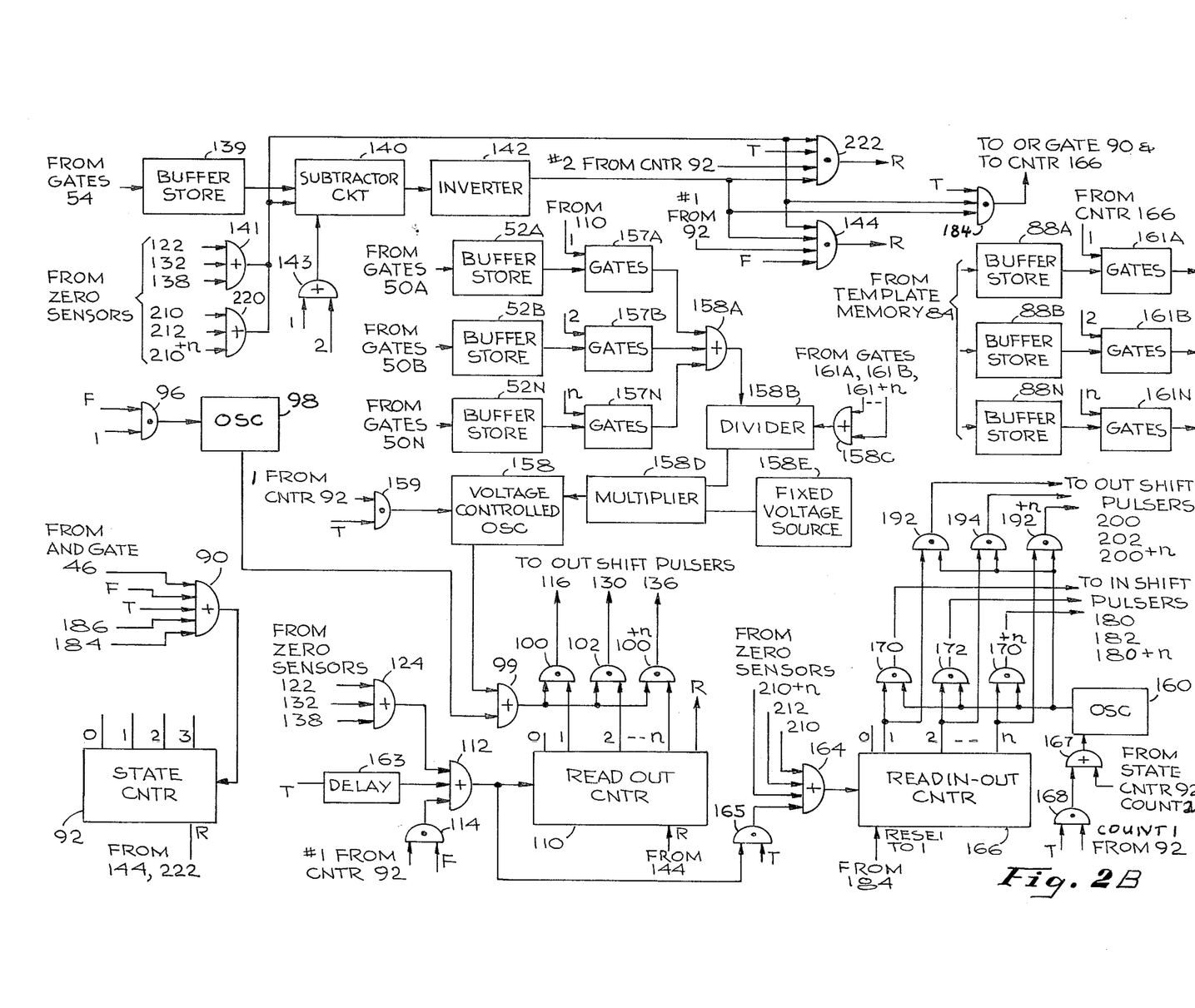

Referring now to FIGS. 2A and 2B, there may be seen a block schematic diagram of circuits for processing the digital sample signals provided by the output of the A/D circuits respectively 20, 22 and 24. Because the processing circuits required are identical for each digital signal train, only one set of these circuits, is shown. FIGS. 2A and 2B, with exceptions which will be noted, are required for processing signals from each one of the outputs of the A/D registers.

Referring now to FIG. 2A, in response to the zero count output of the pen-up counter 36 and the set output of flip flop 32, an And gate 60 is enabled to permit the output from the A/D converter 20, which are the X force signals, to be entered into a shift register 62. Pulses for shifting the X digital signals into the register 62 are generated by an "in shift pulser" 64. The "in shift pulser" is a pulse shaping circuit which is enabled to produce shift pulses in response to the output of an And gate 66. This And gate is enabled by the zero count output from counter 36 and and the set output of flip flop 32, and serves to apply the sample pulse outputs from And gate 38 in FIG. 1, to the in shift pulser.

When the pen-up counter reaches its first count, this is applied to And gates 68 and 70. And gate 68 is thus enabled to transfer the digital outputs from the A/D converter 20 to a second register 72. The register is enabled to enter these X inputs in response to shift pulses received from an in shift pulser 74. The in shift pulser receives the sample pulses from the output of And gate 38 through And gate 70.

It should be appreciated that each pen-up signal enables a succeeding X digital signal sequence, extending until the next pen-up signal, to be entered into a separate register whereby the sequences between pen-ups are separated. The nth count from counter 36 enables two And gates 76 and 78 whereby the nth output from A/D circuit 20 is entered into a register (60+n) in response to shift pulses received from the in shift pulser 82. In shift pulser 82 receives the sample pulses from And gate 38 through an And gate 78.

A template memory 84, will have previously stored therein digital samples of the template signature. These will be stored as separated segments and associated with each segment there will be a number indicative of the total number of samples that were taken during the writing of that segment. Another number will be stored for the total signature which will be the number of pen-ups that occurred during the signing of the template signature. The same circuit as is shown in FIG. 1 may be used for generating this data. The template memory is addressed by a memory address system 86, to which is applied the address of the template signature and associated numbers, prior to or during the signing of the specimen signature. Such addressing may be done in any of the well-known ways, such as by applying an identification number to the memory system, either by means of a keyboard or a card which is read. Techniques for doing this, that is, for storing data in a memory and for addressing the memory for read-out of that data, is old and well-known by now, therefore it will not be described in detail here. Suffice to say that at this time the only data that is required from the template memory is the number of pen-ups which is read into the comparator 56, and the number of samples in successive segments of the template signature which are successively entered into respective template sample buffer circuits 88A, 88B, 88N (FIG. 2B), for temporary storage therein. The indicated information should be non-destructively read out of the memory. It should be appreciated that buffer stores 88A, 88B, 88N correspond to buffer stores 52A, 52B, 52N in which the number of samples taken of corresponding segments of the specimen signature are stored. The end signature signal of And gate 46 is applied to an Or gate 90, (FIG. 2B). The output of the Or gate 90 is applied to a state counter 92 causing it to go into a one-count state. The one-count state of state counter 92 is applied to the comparator 56 to enable it to compare the total number of pen-up signals which occurred in writing the template signature with the total number of pen-up signals occurring during the writing of the specimen signature. If the pen-up counts are equal the comparator will produce a "true" output (T) if the two pen-up counts are not equal, it will produce a "false" (F) output.

Three alternatives may be pursued in the event that a "false" output signal occurs. This may be displayed by any suitable display arrangement and the signature may be declared false. Alternatively, this may be indicated and another specimen signature may be called for. Alternatively the portions of the signatures in the register 62, 72 . . . (60+n) may be sequenced in the order in which they were generated, then applied to a specimen memory 94, FIG. 2A to be processed in the manner of currently known rubbery correlation processing.

The signals in the registers 62, 72 and (60+n) may be transferred to the specimen memory by applying the F signal output of the comparator 56 and the one-count signal of the state counter 92 to an And gate 96, (FIG. 2B). And gate 96 output is used to enable an oscillator 98 to start generating pulses. These are applied through an Or gate 99 to And gates 100, 102 and (100+n). These And gates are successively enabled in response to the count outputs of a read-out counter 110. The read-out counter is enabled to assume its one-count state in response to the output from an Or gate 112. Or gate 112 can produce an output in response to the output from an And gate 114, which is produced in response to an F input, and a one input from counter 92.

In the one count state read-out counter 110 enables the And gate 100 to apply the oscillator pulses received from oscillator 98 to an out shift pulser circuit 116, (FIG. 2A). This is a pulse shaping circuit whose output is used to shift out the digital signals in shift register 62 through the same end of the register as the one through which they were received. These digital signals are applied to an Or gate 118, the output from which is applied to an And gate 120. And gate 120 is enabled in response to an F output from the comparator whereby it will transfer the digital output of register 62 into the specimen memory 94.

When register 62 has shifted out all of its digital samples, they will be followed by a zero. This is sensed by a zero sensor 122. It should be noted that when a digital sample has a zero value it is represented by a digit. This is done to enable the zero sensor to distinguish between a zero value digital sample and a zero which occurs after all the digital signals in the register have been shifted out. The output from the zero digits sensor 122 is applied to Or gates 124 and 141 (FIG. 2B). The output of the Or gate 124 is applied to the Or gate 112 which produces an output which is applied to the read-out counter 110 whereby its count is advanced to its second count state.

Upon reaching the second count state, read-out counter 110 enables And gate 102 whereby pulses are applied to an out shift pulser 130. The outshift pulser circuit 130, enables register 72 to shift out the digital samples in a reverse order in which they were received. These digital samples are applied to the Or gate 118 and then through And gate 120 to the specimen memory, to be added to the digital samples received from the register 62. Another zero sensor 132 senses the zero following the last digital sample coming out of register 72 and applies its output to the Or gates 124 and 141 whereby the read-out counter 110 is advanced to its next count. In the manner described, read-out counter 110 enables the registers to shift out their contents. The next to the last count of the read-out counter enables And gate 100+n to apply pulses to out shift pulser 136. As a result, out shift pulser 136 shifts out the digital samples in register (60+n) to the Or gate 118 and then through And gate 120 they are stored in memory 94 following the previously stored digital samples. Zero sensor 138 applies an output to Or gates 124 and 141 and then through And gate 126 advances the read-out counter 110 to its nth count or last count. This last count is used to reset all circuits that require resetting.

In the event that less than all of the registers 62, 72 and (60+n) are used, which most certainly can and does happen, then provision must be made to determine when the last digital sample has been shifted out of the registers. To accomplish this, the total pen-up count of counter 36 is transferred, when gates 54 are enabled, into the buffer store 139, (FIG. 2B). Its output is applied to a subtractor circuit 140 which is enabled in response to the output of an Or gate 143. Or gate 143 provides an output in response to either the one or the two count outputs of the state counter 92. Subtractor circuit 140 will subtract, from the total pen-up count, the successive outputs of zero sensors 122, 132, and 138. The zero sensor outputs are collected by an Or gate 141, whose output is applied to subtractor 40. The output of subtractor circuit 140 is applied to an inverter 142. When subtractor circuit 140 output reaches zero, inverter circuit 142 provides an output which is applied to three And gates respectively 144, 184, 222. And gate 144, in the further presence of an F input, an output from one of the zero sensors derived from the output of Or gate 141, and a No. 1 count from the state counter, provides an output which is used to reset counters 110 and 92 and all other circuits used thus far, to their starting state. Thereafter, the specimen signature digital samples stored in the memory 94 and the template signature digital samples stored in memory 84 may be processed for correlation in the manner described, for example in the previously mentioned application Ser. No. 681,118, now U.S. Pat. No. 4,040,012, by Crane et al. The reason one more zero sensor output is required is because when a signature is finished no pen-down signal after a pen-up signal occurs, which is required to actuate the pen-up signal counter. Thus, the pen-up counter total count is one less than the number of segments and one less than the number of registers storing those segments. When the zero sensor of the last register holding a segment produces an output, And gate 144 produces a reset output.

When the output of comparator 56 is true, this T output is applied to the Or gate 90 which drives the state counter 92 to its one count state. The one count of this counter and the T output of the comparator circuit are used to "normalize" the contents of registers 62, 72 and (60+$n$). By that is meant that their contents are expanded or decreased until the number of digital samples equals the number of digital samples in the corresponding segment of the template memory. This is accomplished by respectively reading the digital samples constituting the specimen signature segments out of the respective registers 62, 72 and (60+$n$) at rates determined by the number of digital samples taken in each of the respective segments. The output of each of the registers, which is converted to analog signals, are then sampled at a rate determined by the number of samples taken of the corresponding specimen segment. These samples are digitized and then entered into normalizing registers respectively 152, 154, (152+$n$). It will be recalled that the digital numbers representing the number of samples for each segment of the specimen memory are stored in the respective buffer stores 52A, 52B, 52N, and the digital numbers representing the number of samples taken from each corresponding segment of the template signature is stored in the respective template buffers 88A, 88B, 88N. (FIG. 2B).

Buffer stores 52A, 52B, 52C have their outputs connected respectively to respective gates 157A, 158B, 157N. These gates are sequentially enabled, in response to the 1, 2 . . . N counts of counter 110, to apply the buffer store outputs to an Or gate 158A. The Or gate output constitutes one input to a divider 158B.

Template buffer stores 88A, 88B, 88N respectively are connected to respective gates 161A, 161B, 161N. These gates are sequentially enabled by the 1, 2 . . . N output of a counter 166. The outputs from these gates are applied to an Or gate 158C, whose output comprises the second input to divider 158B. The divider divides the number received from Or gate 158A by the number received from Or gate 158C. The output of the divider is applied to a multiplier 158D to be multiplied by a voltage from a voltage source 158E.

An oscillator 160, when enabled as will be hereinafter described, will cause the registers 152, 154, 152+$n$ to shift in the signals being received from the respective registers 62, 72, 62+$n$. The voltage controlled oscillator 158, when enabled, causes the respective registers 62, 72, 62+$n$ to shift out their contents at a rate determined by the oscillation rate of the voltage controlled oscillator, which is determined by the voltage received from the multiplier 158D. Were the fixed voltage from source 158E applied to voltage controlled oscillator 158, it would oscillate at the same frequency as oscillator 160. By dividing the number of specimen samples, by the number of template samples and multiplying the result by the fixed voltage, a voltage is obtained, which, when applied to the voltage controlled oscillator 158 results in the registers 152, 154, 152+$n$ deriving from registers 62, 72, 62+$n$ the same number of samples as there are in the template segments.

For example, assume that there are 10 template samples in a segment and 15 specimen samples in a corresponding specimen segment. Assume that the fixed voltage is one volt. Then, the voltage controlled oscillator 158 will provide an output frequency which is 1½ times the frequency used to drive the normalizing register. Thus when, for example, register 152 and 62 are simultaneously operated and register 62 shifts out its contents at 1½ times the frequency which register 152 shifts in any input, register 152 will only ingest 10 specimen samples from all 15 specimen samples and the specimen segment is then normalized.

Voltage controlled oscillator 158 is enabled to oscillate in response to a one count of state counter 92 and a T signal which are applied to And gate 159. Oscillator 160 is enabled to oscillate also in response to a one count of state counter 92, which is applied to an And gate 167, whose output is applied to an Or gate 168. The output of Or gate 168 enables oscillator 160 to oscillate.

The output of the voltage controlled oscillator 158 is applied to the Or gate 99. The output of the Or gate 99 is applied to the respective And gates 100, 102 and (100+$n$). These And gates are sequentially enabled in response to the count outputs of the read-out counter 110.

The T output of the comparator 56, is applied to a delay circuit 163, (FIG. 2B). The delay output from delay circuit 163 is applied to the Or gate 112 whereupon read-out counter 110 is advanced to its one-count state. The delay is to enable the oscillators 158 and 160 to attain their steady oscillation states after being enabled. And gate 100 applies the oscillations received from the voltage-controlled oscillator 158 to the out shift pulser 116. The register 62 now commences to transfer out the digital samples received from the beginning of the specimen signature up until the first pen-down signal occurrence.

The output of the Or gate 112 (FIG. 2B) is also applied to an And gate 165, which, in the presence of a T signal applies the signals received to an Or gate 164. The output from Or gate 164 advances the count of a read-in-out counter 166 to its one state. Thereby, in the presence of a T signal, counter 166 advances together with counter 110. It may have the same count capacity as counter 110, and also has, for the purpose of enabling data read-in to the normalizing registers, an And gate assigned to each count output, respectively 170, 172, (170+$n$). These respective And gates receives as a second input, oscillations from oscillator 160. These And gates have their outputs respectively connected to in shift pulser circuits respectively 180, 182, (182+$n$). These in shift pulser circuits will sequentially receive the oscillations from the oscillator 160 through the respective And gates 170, 172 and (170+$n$) as the read-in-out counter has its count advanced.

The output of register 62 is applied to a digital to analog converter 62A. The output of the digital to analog converter is applied to a sample and hold circuit 62B which provides an output which holds the last output of the digital to analog converter 62A. A gate 62C is enabled to sample the output of the sample and hold circuit each time a pulse is received from the oscillator 160. The gate 62C output is applied to an analog to digital circuit 62D, which converts the analog signal to digital form. The pulse from oscillator 160 is also applied to the in shift pulser circuit 180 whereby the digital output of the analog to digital converter 62D is entered into shift register 152.

In view of the fact that the voltage controled oscillator 158 and out shift pulser 116 cause shift out of the stored samples of a specimen signature segment at a rate which is proportionately increased or decreased relative to the rate at which oscillator 160 and in shift pulser enable sampling of this output by the normalizing register, which proportional increase or decrease is determined by the number of samples in a specimen segment divided by the number of samples in a corresponding template segment, the normalizing register will contain, at the time that the transfer from register 62 is terminated at pen-up time, the same number of samples of the specimen signature segment as were contained in the corresponding template signature segment, and further these samples are derived from locations which are spaced equally apart from one another over the entire specimen signature segment. Thus the specimen signature segment has been normalized, i.e. expanded or contracted to the same size as the template signature segment. The circuits 62A, 62B, 62C and 62D serve to provide an interpolation function when the frequencies at which registers 62 and 152 are shifted are not integrally related.

When zero sensor 122 senses the end of the segment stored in register 62, it applies an output to Or gate 124. The output of this Or gate is applied, through Or gate 112 to advance counter 100 to its second count state, and the output from Or gate 112 is applied, through And gate 165 and Or gate 164, to drive the counter 166 to its second count state.

The second count states of counters 110 and 166 besides respectively enabling And gates 102 and 172, enables gates 157B and 161B to respectively apply the contents of buffer stores 52B and 88B to divider circuit 158B through respective Or gates 158A and 158C. Out shift pulser 130 causes register 72 to shift out its contents at a rate determined by the output of voltage controlled oscillator 158. These are transferred to normalizing register 154 through analog to digital circuit 72A, sample and hold circuit 72B, gate 72C and analog to digital circuit 72D, at a rate determined by the output of oscillator 160. Thus the operation of the circuits on the digital samples of the second segment of the specimen memory is the same as described for the digital samples of the first segment, which results in storing a normalized second specimen in the normalizing register 154. Zero sensor 132 produces an output at the end of the transfer out from register 72 of the second segment. This output advances counters 110 and 166 to their third count.

From the foregoing it should be clear how each segment of the specimen signature is normalized in turn and transferred to a normalizing register.

The subtractor circuit 140 and the inverter circuit 142 function in the manner previously described to subtract from the number of pen-downs, outputs from the respective zero sensor circuits 122, 132 and 138, whereby when these are equal, the inverter 142 is enabled to provide an output. The inverter output is applied to an And gate 184. This And gate is enabled in response to the output of the last zero sensor, a T input, and a one input from state counter 92. The output of this And gate is applied to the Or gate 90 whereby the state counter 92 is advanced to its Number two-count state.

The two-count state of the state counter enables the transfer out of the contents of the normalizing registers, in the sequence received, into the specimen memory. The two-count is also applied to Or gate 143, whereby subtractor 140 is enabled to perform another subtraction.

The output of the And gate 184 is used to reset the read-in-out counter 166 to its first count state. Three And gates respectively 192, 194 and (192+n) are respectively enabled in response to the first, second, nth, outputs of the read-in-out counter 166. When they are enabled, they can pass oscillations from the oscillator 160. This oscillator is enabled by the two-count output of the state counter 92, which is applied via Or gate 165.

The outputs of And gates 192, 194 and (192+n) respectively, are applied to out shift pulsers 200, 202, (200+n). The normalizing registers will, in response to the out shift pulser signals sequentially shift out their contents into the specimen memory. Their outputs are applied to an Or gate 204, the output from which is applied to an And gate 206. This And gate is enabled in the presence of a T input as well as a two count from the state counter. The output of the And gate 206 is thereafter applied to the specimen memory 94, and stored therein. Such storage may be spaced or segmented in accordance with the segments of the specimen signal indicated in response to the pen-up signals. The memory may be instructed to do this in response to the count outputs from the read-in-out counter 166, which will occur upon the end of the output from each of the respective normalizing registers.

The read-in-out counter is now sequenced in a similar manner to the previously used sequencing technique. A zero sensor 210 is connected to the output of normalizing register 152. A zero sensor 212 is connected to the output of the normalizing register 154. A zero sensor (210+n) is connected to the output of normalizing register 152+n. The outputs of these three zero sensor circuits, when they sense a zero, which occurs when the last digital sample has been transferred out of the respective normalizing registers, are applied to the Or gate 164 the output from which advances counter 166.

The subtractor circuit 140, and the inverter circuit 142 serve the same function as they did previously, to indicate when the contents of all of the normalizing registers have been transferred to the specimen memory. This is achieved by applying the outputs of the respective zero sensors 210, 212, (210+n) to an Or gate 220. The total of the outputs of this Or gate is subtracted from the total number of pen-up signals which is maintained in the subtractor circuit 140 by the output of buffer store 139. When the subtractor circuit output reaches zero again, the inverter 142 provides another output to an And gate 222. This And gate is enabled by a T input, by a last zero sensor output, and the two-count output of the state counter, whereby its output can be used to reset the system for the purposes of being used again.

If it is desired to insert special separation signals at the locations of the occurrences of pen-ups in the sequence of digital samples being supplied to the specimen memory 94, then this can be done by the circuit arrangement shown in FIG. 3. The outputs from the zero sensors 210, 212, and (210+n) are applied to an Or gate 230. Each time an output is obtained from this Or gate a pen-up signal generator 232 applies a special pen-up signal to an Or gate 234. The other inputs to the Or gate 234 constitute the successive outputs from the normalizing registers 152, 154 and 152+n. The output of the Or gate 234 is then entered into the specimen memory. The indicated pen-up signals may be signals indicative of the beginning and the end of the particular specimen signature signals which may be used in a system, such as is described in the previously indicated application, Ser. No. 681,118, now U.S. Pat. No. 4,040,012.

As shown in FIG. 4, the specimen memory system 94 and the template memory system 84 may now be connected to correlation circuits 236 for the purposes of comparison. Since the specimen signature segments have been stretched or reduced in length, as the case may be so that they are now equal to the template signature segments, and since both signatures have their segments aligned, the processing of these signatures for the purposes of the correlation comparison, performed by the correlation circuits 236 is very simple. All that is required is direct correlation, or a translation, or, a shifting of the signals of one signature may be made with respect to the other for the purposes of searching for a best fit. This may be done by recording the signals on two tapes and successively displacing these tapes, or may be done directly from the digital signals in the manner described in detail in the indicated application Ser. No. 681,118, now U.S. Pat. No. 4,040,012. Alternatively the correlation processing may be done using any of the other, known numerous correlation techniques, such as subtracting each digital sample of the specimen signature from the corresponding digital sample of the template signature segments, and adding the absolute value of each such difference, etc. In any event, the correlation circuit outputs will provide a true or false indication to an indicator 238.

The processing of the X digital samples which has been described and shown in FIGS. 2A and 2B is also carried out with the Y and P signals. This may be done simultaneously with the X signal processing by duplicating the circuits of FIGS. 2A and 2B for Y and P, or the Y and P digital samples may be stored and then successively processed after X digital sample processing, by the one set of circuits.

The processing of the template signature signals only requires their breakup into segments between landmarks, which is done by transferring the segments into registers 62, 72 and (60+n), counting the samples in each segment, and counting the number of landmarks, respectively handled by counters 40 and 36. This data is then transferred into the template memory at a predetermined address, to be available for read out when required for correlation. The techniques for transfer into memory are known quite well and thus need not be described here.

By the process described, of normalizing segments of a specimen signature signal between landmarks, which correspond to landmarks between segments of the template signature signal, the process of correlation is made simpler. While "pen-ups" have been used as landmarks, other landmarks may also be used, without departing from the scope and spirit of this invention. Also, it should be noted that the word "signature" as used in this application is not restricted to a person's name. Any writing or signal train, such as an acoustic signal train, which is to be identified may be considered as a "signature".

Accordingly, there has been described herein a novel and useful system for simplifying and improving the process of signature correlation.

The embodiments of the invention in which an exclusive property or privilege is claimed are defined as follows:

1. In a system wherein a template signature, which is produced, is to be correlated with a subsequently produced specimen signature, and both said signatures have natural landmarks, occurring therealong as they are being produced, the method of segmenting and normalizing the lengths of the signatures between landmarks comprising:

for said template signature;
generating a plurality of trains of signals, as said template signature is being produced, each train representing a different parameter of said template signature,
sampling each train of signals to provide a train of sample signals,
detecting each of the natural landmarks in said template signature, as it is being produced and producing a landmark signal for each,
adding the number of landmark signals to produce a landmark total,
separating each of the trains of sample signals in response to landmark signals, into segments, each segment comprising the sample signals generated between landmark signals,
counting the number of sample signals in each segment, to provide a total number of sample signals for each segment,
for said specimen signature,
generating a plurality of trains of signals, each train representing a different parameter of said specimen signature but corresponding to a parameter of said template signature,
sampling each train of signals to provide a train of sample signals,
detecting each of the natural landmarks in said specimen signature, as it is being written and producing a landmark signal for each,
adding the number of landmark signals to produce a landmark total,
separating each of the trains of sample signals in response to landmark signals, into segments, each segment comprising the signals generated between landmark signals,
comparing the template signature landmark total with the specimen signature landmark total and producing a true signal if they are alike,
in response to said true signal, for each identical parameter of said specimen and template signature,
deriving from each entire segment of each said specimen signature signal train substantially the same number of sample signals as the total number of sample signals for each corresponding segment of a corresponding template sample signal train, and
correlating said segments of said template signature signal trains containing samples with corresponding segments of said specimen signature signal trains which contain the same number of sample signals.

2. In a system as recited in claim 1 wherein:
said step of deriving from each entire segment of said specimen signature signal trains the same number of sample signals as the total number of sample signals for corresponding segments of the template signature signal trains, comprises:
for each specimen signal train;

successively applying each segment of a signal train to a separate normalizing shift register means at a first rate, sampling each entire segment applied to each normalizing shift register means at a second rate, said first and second rates being related by the ratio of the total number of samples in a specimen signal train to the total number of samples for the corresponding segment of a template signature sample signal train, and entering said samples of said segments into each said normalizing register means.

3. In a system as recited in claim 1 wherein said template and specimen signatures are produced by writing said signatures with a pen, and a natural landmark occurs when said pen is lifted from the medium on which said signature is written during the writing thereof.

4. In a system as recited in claim 1 wherein said step of deriving from each entire segment of each said specimen signature signal train substantially the same number of sample signals as the total number of sample signals for each corresponding segment of a corresponding template sample signal train comprising:

sampling each specimen signal train to produce a specimen sample signal train, entering the sample signals in a train of specimen sample signals following each said detected landmark signal into a separate register whereby each register contains a segment, counting the number of sample signals in each segment, transferring a segment out of each different register at a first rate, sampling the entire segment being transferred out of a shift register at a second rate, said first and second rates being related by the ratio of the number of samples in the specimen signal train segment to the number of samples in a corresponding segment of a corresponding template signal train segment, and entering the samples segment transferred out of a register into another register.

5. In a system wherein a template signature, which is written, is to be correlated with a substantially written specimen signature, and said written signatures have natural landmarks, occurring therealong as they are being written, the method of normalizing as well as segmenting the lengths of the signatures between landmarks comprising:

for each different parameter of said template signature;

generating a train of sample signals as said signature is being written, detecting the occurrence of natural landmarks as one of said parameter sample signal trains is being generated, and producing a landmark signal for each, separating each train of sample signals into segments in response to landmark signals, each segment comprising the sample signals occurring between landmark signals, counting the number of sample signals in each segment, for each different parameter of said specimen signature, generating a train of sample signals as said specimen signature is being written, each train having the same number of sample signals, detecting the occurrence of natural landmarks as one of said parameter sample signal trains is being generated, and producing a specimen signal for each, separating each train of sample signals into segments in response to specimen signals, each segment comprising the sample signals occurring between specimen signals, for each different parameter of said specimen signature;

altering the number of sample signals between natural landmarks in successive segments of a train of sample signals until they equal the number of sample signals in corresponding successive segments of a corresponding sample signal train of an identical parameter of said template signature, and storing both said template and specimen signature sample signal train segments in segment identifiable format.

6. In a system wherein a template signature, which is written, is to be correlated with a subsequently written specimen signature, and said written signatures have natural landmarks, occurring therealong as they are being written, a system for normalizing as well as segmenting the lengths of the signatures between landmarks comprising:

for said template signature;

means for generating a plurality of trains of sample signals, each train representing a different parameter of said template signature, means for detecting each of the natural landmarks in said template signature, as it is being written and producing a landmark signal for each, means for adding the number of landmark signals to produce a landmark total, means for separating each of the trains of sample signals, each representing a different parameter, in response to landmark signals, into segments, each segment comprising the sample signals generated between landmark signals, means for counting the total number of sample signals in each segment, for each specimen signature;

means for generating a plurality of trains of sample signals, each train representing a parameter of said specimen signature corresponding to a parameter of said specimen signature, means for detecting each of the natural landmarks in said specimen signature as it is being written, and producing a landmark signal for each, means for adding the number of landmark signals to produce a landmark total, means for separating each of the trains of sample signals, in response to landmark signals, into segments, each segment comprising the sample signals generated between specimen signals, means for counting the total number of sample signals in each of said segments, means for comparing the template signature landmark total with the specimen signature landmark total and producing a true signal if they are alike, in response to said true signal, for each identical parameter of said specimen and template signature, means for altering the number of sample signals between natural landmarks in successive segments of a parameter of said specimen signature until they equal the number of sample signals in corresponding successive segments of an identical parameter of said template signature, and means for storing said segments of said sample signal trains of said template signature parameters and said segments of said sample signal trains of said specimen signature parameters which have had the number of sample signals altered.

7. In a system as recited in claim 6 wherein:

said means for altering the number of sample signals between natural landmarks in successive segments of a parameter of said specimen signature until they equal the number of sample signals in corresponding successive segments of an identical parameter of said template signature, comprises:

for each parameter sample signal train, a plurality of normalizing shift registers, means for successively applying sample signals in each segment of a sample signal train to a different one of said plurality of normalizing shift registers at a first rate, and means for successively entering sample signals from a segment applied to a normalizing shift register at a second rate, said first and second rates being related by the ratio of the total number of samples in a specimen signature segment to the total number of samples in a corresponding segment in a corresponding template signature sample signal train.

8. In a system as recited in claim 6 including means for generating a natural landmark signal when a pen, used for writing a template or a specimen signature is lifted from the medium on which said signature is written during the writing thereof.

9. In a system as recited in claim 8 wherein the apparatus for separating each of the trains of sample signals in response to landmark signals into segments, each segment comprising the sample signals between landmark signals comprising:

a plurality of separate registers, means for entering the sample signals in a train of sample signals following each said landmark signal into a different one of said separate registers.

10. In a system wherein a template signature, which is written, is to be correlated with a subsequently written specimen signature, and said written signatures have natural landmarks, occurring therealong as they are being written, a system for normalizing as well as segmenting the lengths of the signatures between landmarks comprising:

for each different parameter of said template signature, means for generating a train of signals as said signature is being written, means for detecting the occurrence of natural landmarks as said signal trains are being generated, and producing a template landmark signal for each, means for separating each train of signals into segments in response to template landmark signals, each segment comprising the signal train occurring between succeeding template landmark signals, for each different parameter of said specimen signature, means for generating a train of signals as said signature is being written, means for detecting the occurrence of natural landmarks as said signal trains are being generated, and producing a specimen landmark signal for each, means for separating each train of signals into segments in response to sepcimen landmark signals, each segment comprising the signal train occurring between succeeding specimen landmark signals, for each different parameter of said specimen signature, means for altering the length of signal trains of the segments of each parameter of said specimen signature until they equal the length of the signal trains of the corresponding segments of an identical parameter of said template signature, and means for storing both said template and specimen signature parameter segmented, sample signal trains in segment identifiable format.

* * * * *